United States Patent [19]

Fenton

[11] Patent Number: 5,245,517
[45] Date of Patent: Sep. 14, 1993

[54] LIGHTED BICYCLE CARRIER BAGS

[75] Inventor: Timothy J. Fenton, New Canaan, Conn.

[73] Assignee: Cannondale Corporation, Georgetown, Conn.

[21] Appl. No.: 963,126

[22] Filed: Oct. 19, 1992

[51] Int. Cl.$^5$ .......................... A45C 15/06; B62J 9/00
[52] U.S. Cl. ...................... 362/156; 362/72; 362/84; 362/191; 362/802; 224/31
[58] Field of Search ............ 362/72, 84, 154, 156, 362/155, 183, 191, 200, 205, 802; 224/31, 39

[56] References Cited

U.S. PATENT DOCUMENTS

| | | | |
|---|---|---|---|
| 690,753 | 1/1902 | McCormick | 362/156 |
| 702,403 | 6/1902 | Chapman | 362/156 |
| 1,183,268 | 5/1916 | Baldwin et al. | 362/156 |
| 1,320,574 | 11/1919 | Robinson | 362/156 |
| 1,531,288 | 3/1925 | Johnston | 362/156 |
| 4,093,263 | 6/1978 | Rihm | 280/289 R |
| 4,786,141 | 11/1988 | Kitrell | 350/99 |
| 4,926,296 | 5/1990 | Blume et al. | 362/156 |
| 5,067,063 | 11/1991 | Granneman et al. | 362/156 |
| 5,127,563 | 7/1992 | Chan et al. | 224/39 |

FOREIGN PATENT DOCUMENTS 683628 12/1952 United Kingdom .............. 362/72

Primary Examiner—Stephen F. Husar
Attorney, Agent, or Firm—Brumbaugh, Graves, Donohue & Raymond

[57] ABSTRACT

A lighted bicycle carrier bag comprises a bag body of flexible sheet material defining an enclosed space and suitable elements for attaching the body to a portion of a bicycle. An electroluminescent light source in the form of a strip is attached to the exterior of the body in a position such that it is visible to an observer from a multiplicity of aspects including both sides and either the rear or the front when the carrier bag is mounted on the bicycle A source of electrical power adapted to energize the light source is attached to a component of the carrier bag within the enclosed space and is connected by electrical conductors such as to form a circuit between the power source and the light source. A switch is interposed in the electrical circuit to selectively open and close the circuit.

11 Claims, 2 Drawing Sheets

5,245,517

LIGHTED BICYCLE CARRIER BAGS

BACKGROUND OF THE INVENTION

Bicycle carrier bags are widely used by recreational bicyclists to carry with them when they ride articles of all descriptions, perhaps the most common articles being tools, food, beverages, and clothing. Bicycle carrier bags include handlebar bags, seat bags, and front and rear rack panniers.

It has long been common for manufacturers of bicycle carrier bags to equip them with light reflectors to enable motorists to see the bicycle at night. Ordinarily, there will be a single reflector In the case of bags visible from the rear, a red reflector facing rearwardly is often provided. Many bags that are visible from the front have white reflectors that face forwardly. The effectiveness of reflectors on carrier bags in making the presence of a bicycle known to motorists varies considerably with many factors, such as the location and orientation of the bicycle relative to the motorist, the distance between the bicycle and the motorist, and the setting of the vehicle headlights (high or low beam). Reflectors facing to the front or rear, as the case may be, are visible through only a relatively small angle near the longitudinal axis of the bike, so a reflector on a carrier bag of a bicycle moving around a curve, for example, will not be seen until a motorist is very close. Similarly, a vehicle with its headlights on low beam will not illuminate the reflectors at large distances. It is also common for some carrier bags to be deformed by the load they are carrying, so they do not face in a direction that is optimal to reflecting light back to a remote observer.

SUMMARY OF THE INVENTION

There is provided in accordance with the present invention, a lighted bicycle carrier bag comprising a bag body of flexible sheet material defining an enclosed space and suitable elements for attaching the body to a portion of a bicycle. An electro-luminescent light source in the form of a strip is attached to the exterior of the body in a position such that it is visible to an observer from a multiplicity of aspects including both sides and either the rear or the front when the carrier bag is mounted on the bicycle. A source of electrical power adapted to energize the light source is attached to a component of the carrier bag within the enclosed space and is connected by electrical conductors such as to form a circuit between the power source and the light source. A switch is interposed in the electrical circuit to selectively open and close the circuit.

Preferred embodiments of the invention have one or more of the following characteristics:

the power source is located in a portion of the enclosed space that is proximate to the uppermost part of the space when the bag is mounted on the bicycle so that it is not subject to the weight of articles contained in the bag;

a substantially rigid plate-like support member is located within the bag, and the power source is attached to the support member;

an attachment arrangement, such as hook and loop cloth, is provided for detachably fastening the power source to the support member;

the switch is a magnetically-actuated switch having electrical contacts within the enclosed space and an actuator magnet carried on the outside of the bag body by a carrier member attached to the bag body that is movable between a position in which the switch is open and a position in which the switch is closed;

the carrier member is a pocket of flexible material containing the actuator magnet;

elements, such as hook and loop cloth, are provided for releasably affixing the carrier member to the bag body in the position in which the switch is closed;

the pocket in which the actuator magnet is received is made of one element of hook and loop cloth, and the other element of the hook and loop cloth is affixed to the bag body;

elements, such as hook and loop cloth, are provided for detachably fastening the light source to the bag body.

For a better understanding of the invention, reference may be made to the following description of an exemplary embodiment, taken in conjunction with the figures of the accompanying drawings.

DESCRIPTION OF THE EMBODIMENT

Figure 1:
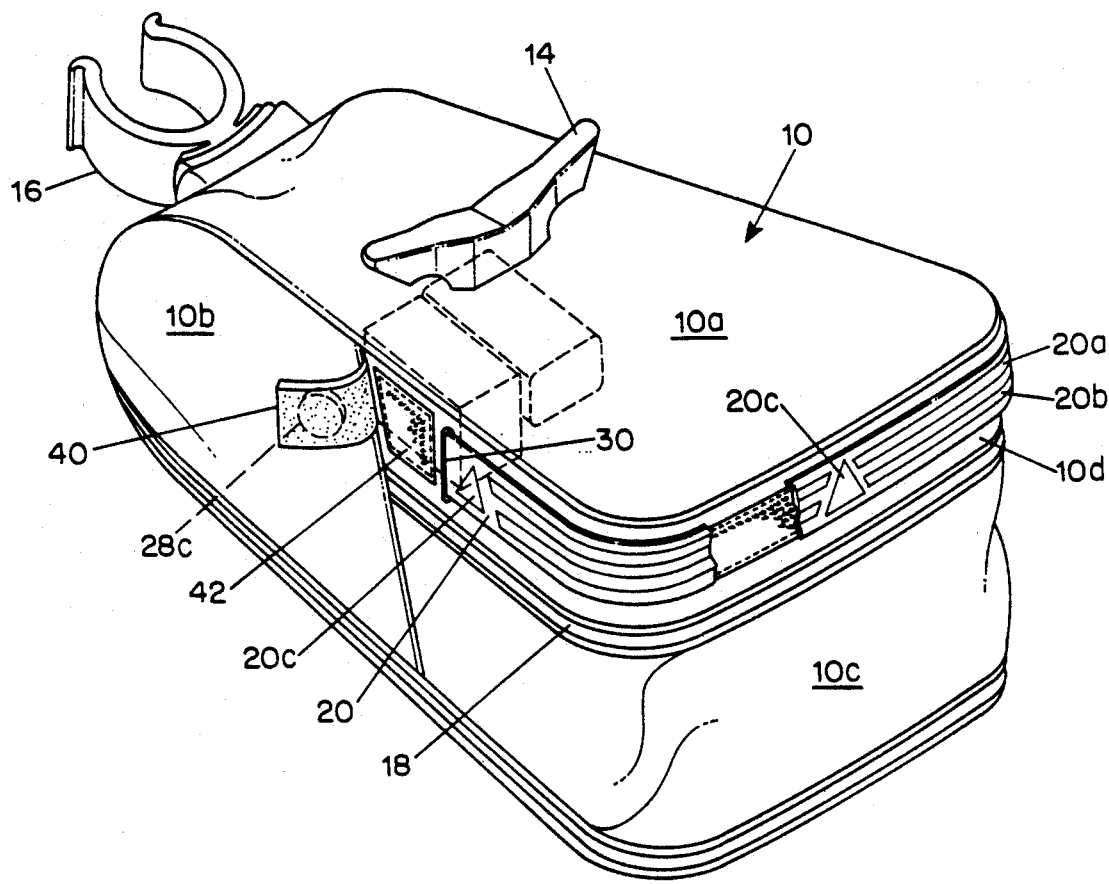
FIG. 1 is a pictorial view of the embodiment.
Figure 2:
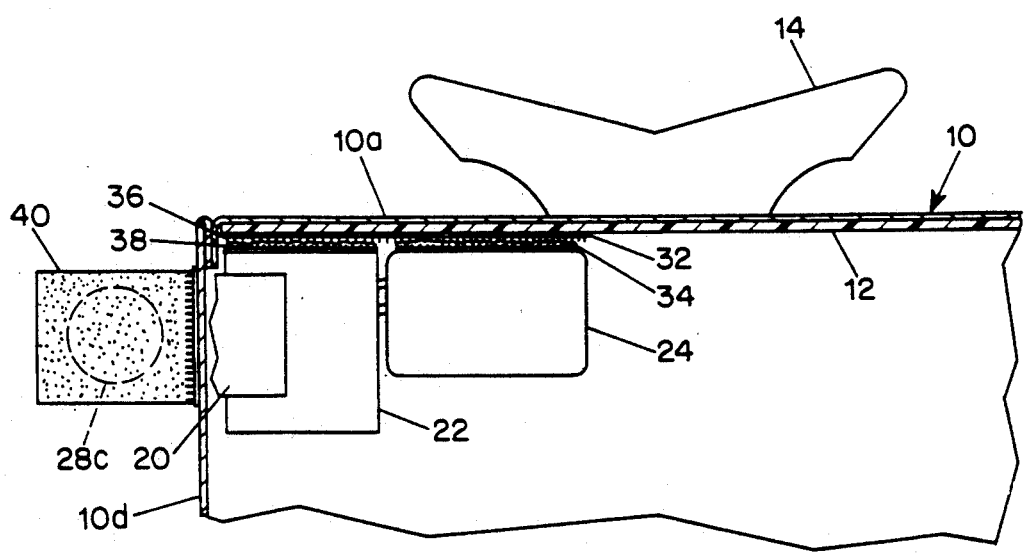
FIG. 2 is a fragmentary cross-sectional view taken along a transverse plane, as represented by the lines 2—2 in FIG. 1.
Figure 3:
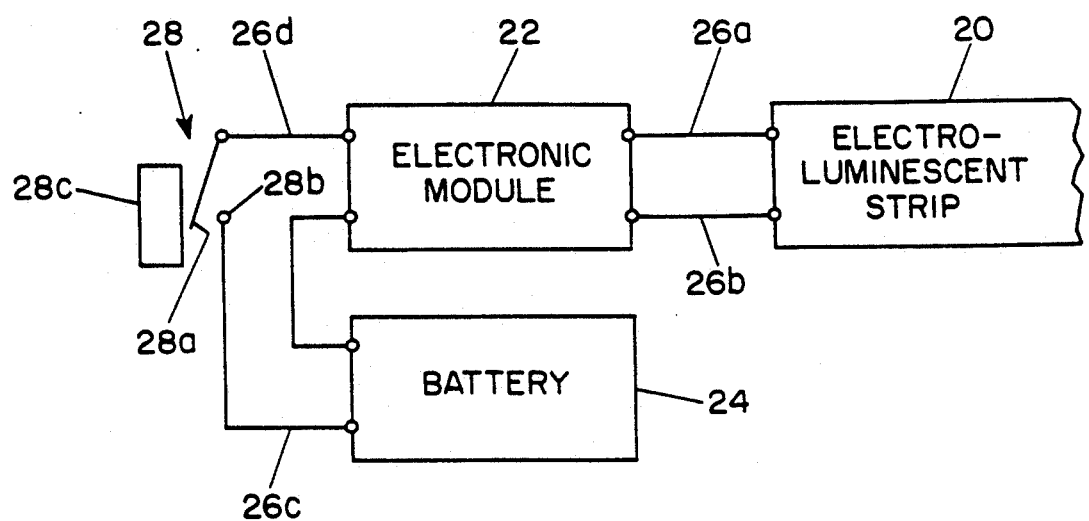
FIG. 3 is a schematic diagram of a power circuit for the light source.

The embodiment shown in the drawings is a bicycle seat bag, which, apart from the lighting system, is known in the prior art by virtue of the marketing of several styles of seat bags by Cannondale Corporation of Georgetown, Conn., under the trademark "Seat Cleat." The "Seat Cleat" bags are described and shown in U.S. Pat. No. 5,127,563 (Chan et al., Jul. 7, 1992) which is hereby incorporated into the present specification by reference. Briefly, the seat bag consists of a bag body 10 of a durable fabric, such as a woven "Cordura" nylon fabric, a liner element 12 of a semi-rigid plastic sheet received within the fabric body, and an attachment system 14, 16. One fabric panel 10a of the body extends along the top, curves over the front and extends along the bottom. Other fabric panels 10b, 10c, and 10d form the side and rear walls of the body. Access to the interior of the body is through a zippered opening 18 that runs along parts of the side walls and along the back wall. The liner element 12 is substantially coextensive with the body panel 10a—i.e., it extends along the top and bottom walls and curves over the front wall—, imparts shape to the bag and contributes to the load-carrying capability of the bag by supporting articles so that they do not distend or distort the shape of the bag.

The attachment system includes a cleat-like member 14 that fits over the rails of a bicycle seat and a clip 16 that snaps onto the seat post. As shown in U.S. Pat. No. 5,127,563, referred to above, the cleat member 14 and clip 16 are attached to the liner and bag body by rigid plastic attachment members within the bag (not shown in the accompanying drawings).

The lighting system includes an electroluminescent light source 20 in the form of a strip attached to the exterior of the bag body 10 in a position such that it is visible to an observer from a multiplicity of aspects, including both sides and the rear when the carrier bag is mounted on the bicycle, a source of electrical power 22, 24 adapted to energize the light source attached to a component of the carrier bag within the enclosed space defined by the bag body, and electrical conductors 26 forming a circuit between the power source and the light source. A switch 28 is interposed in the electrical circuit to selectively open and close the circuit Electroluminescent light strips, which are available commercially from several sources, are composed of a fabric substrate on which are mounted an array of light-emitting elements, which can be arranged in any desired pattern. In the embodiment, the light-emitting elements consist of two stripes or bands 20a, 20b and triangles 20c. The light strip 20 extends along parts of each side and along the back of the bag body adjacent the juncture of the top wall with the side and back walls. One end of the light strip 20 leads through a slit 30 in one side wall of the bag body into the interior of the bag and is attached to the electronic module 22 of the power source. The module 22 includes circuitry, which is known per se, for transducing and transforming direct electrical current from a battery 24 to alternating electrical current of a voltage and frequency suitable for powering the light source 20. In the embodiment, the circuitry of the module also provides for turning the light source on and off for predetermined intervals so that it flashes and thus attracts greater attention.

In the embodiment, the module 22 also includes the contact elements 28a, 28b of a magnetic reed switch 28. The power circuitry for the light strip and the contact elements are contained in a rigid case and are mechanically stabilized and protected by a potting compound. A portion of the end of the light strip 20 enters the case and is connected to the power circuitry by conductors 26a, 26b, which are within the module. A standard 9-volt battery 24, preferably a rechargeable battery, is connected to a connector (also standard and not shown), one of the conductive leads 26c of which is connected to switch contact 28b and the other lead 26d of which is connected to the circuitry of the module. The other switch contact 28a is connected to the circuitry by a conductor 26d.

For ease and economy of manufacture and assembly, the light strip 20, battery 24 and electronic module are attached to the bag by hook and loop cloth ("Velcro") elements. The strip 20 has a loop cloth strip stitched to its back face, and the bag body panel 10d has patches of hook cloth stitched to it. As sold, the seat bag includes adhesive-backed pieces 32, 34 of hook and loop cloth that the user applies to the undersurface of the liner strip 12 at the top of the bag and to the battery 24 to attach the battery to the strip 12 and adhesive-backed pieces 36, 38 of hook and loop cloth to attached the module to the undersurface of the top of the liner strip adjacent the battery and close to the side wall. Alternatively, a loop or pocket can be provided for the battery.

The magnet 28c of the magnetic reed switch 28 is received in a small bag or pocket 40 of loop cloth material that is stitched to the outside of the bag body adjacent the electronic module. Normally, the pocket 40 stands out from side wall of the bag, a position in which the magnet 28c does not activate the reed switch 28 and in which the switch is open and the light strip is not energized. When the user pushes the pocket 40 into engagement with a piece of loop cloth 42 stitched to the bag, the magnet 28c closes the reed switch contacts 28a and 28b, thereby completing a circuit from the battery to the light strip and turning the light on.

The light strip emits a flashing light that is readily seen from relatively long distances away and from many aspects to the rear and the sides of the bicycle by motorists and others, thereby enhancing the safety of the cyclist and motorists, who will be prepared to avoid the cyclist well in advance and will not have to take sudden, possibly dangerous action to stay clear of the cyclist.

The electronic components are located at the top of the bag where they are not subject to the weight of objects in the bag. The electronic module is durable and well-protected from the environment It is easy to replace the battery. If the light strip or module should fail, they can be replaced readily by the user. The convenience of operation of the switch from outside the bag is an important advantage, as is the fact that the switch elements are encased and protected.

It will be readily apparent to those skilled in the art that other fastening systems, such as snaps, buttons, straps, stitching and the like, can be used for mounting the light system on the bag. As mentioned above, the light system can be incorporated on bicycle bags other than seat bags. Numerous forms of light patches and light strips with light-emitters of many shapes and sizes are possible

I claim:

1. A lighted bicycle carrier bag comprising a bag body of flexible sheet material defining an enclosed space, means for attaching the body to a portion of a bicycle, an electro-luminescent light source in the form of a strip attached to the exterior of the body in a position such that it is visible to an observer from a multiplicity of aspects including both sides and either the rear or the front when the carrier bag is mounted on the bicycle, a source of electrical power adapted to energize the light source attached to a component of the carrier bag within the enclosed space, electrical conductor means forming a circuit between the power source and the light source, and a switch interposed in the electrical circuit adapted to selectively open and close the circuit.

2. A lighted bicycle carrier bag according to claim 1 wherein the power source is located in a portion of the enclosed space that is proximate to the uppermost part of the space when the bag is mounted on the bicycle so that it does not support the weight of articles contained in the bag.

3. A lighted bicycle carrier bag according to claim 2 wherein the mounting means includes a substantially rigid plate-like support member located within the bag and the power source is attached to the support member.

4. A lighted bicycle carrier bag according to claim 3 and further comprising attachment means for detachably fastening the power source to the support member.

5. A lighted bicycle carrier bag according to claim 4 wherein the attachment means is hook and loop cloth.

6. A lighted bicycle carrier bag according to claim 1 wherein the switch is a magnetically-actuated switch having electrical contacts within the enclosed space and an actuator magnet carried on the outside of the bag body by a carrier member attached to the body that is movable between a position in which the switch is open and a position in which the switch is closed.

7. A lighted bicycle carrier bag according to claim 4 wherein the carrier member is a pocket of flexible material contained the actuator magnet.

8. A lighted bicycle carrier bag according to claim 4 and further comprising means for releasably affixing the carrier member to the bag body in each of the positions.

9. A lighted bicycle carrier bag according to claim 6 wherein the means for releasably affixing the carrier member to the bag body in each of the positions is hook and loop cloth, one element of which forms a pocket in which the actuator magnet is received and the other element of which is affixed to the bag body.

10. A lighted bicycle carrier bag according to claim 1 and further comprising attachment means for detachably fastening the light source to the bag body.

11. A lighted bicycle carrier bag according to claim 7 wherein the attachment means is hook and loop cloth.

* * * * *